Patented Feb. 20, 1923.

1,446,004

UNITED STATES PATENT OFFICE.

CARLETON ELLIS, OF MONTCLAIR, NEW JERSEY.

LARD SUBSTITUTE.

No Drawing.      Application filed January 30, 1919. Serial No. 273,942.

*To all whom it may concern:*

Be it known that I, CARLETON ELLIS, a citizen of the United States, and a resident of Montclair, in the county of Essex and State of New Jersey, have invented certain new and useful Improvements in Lard Substitute, of which the following is a specification.

This invention relates to a lard-like substance consisting of completely hydrogenated oils particularly nut oils so that the lard-like product consists of completely saturated fats derived from nut oils.

It has been proposed to employ partially hydrogenated oils and mixtures of highly hydrogenated oils with ordinary liquid oils, the idea prevailing that only enough hydrogenated oil should be used to stiffen the mixture to the consistency of a lard composition. It has been supposed that unsaturated fats were far more digestible and nourishing than saturated fats hence, for example, cottonseed oil would be hydrogenated until the iodine number dropped from its natural value of about 106 to say 90 or approximately that of ordinary olein. It has also been supposed that the complete hydrogenation of oils would produce by-products which would not be acceptable. The present invention is a departure from the former practice in that it involves the production of a completely hydrogenated product of an edible and nutritive character, free from toxic bodies or other objectionable products.

In carrying out the invention a mixture of oils is employed preferably employing cocoanut oil or palm kernel oil as the basis or major portion and adding another vegetable oil to produce a composition which on complete hydrogenation yields a product of about the consistency of lard so that it may be termed lard-like in the sense that it has about the consistency of lard and replaces it in ordinary cooking operations in an advantageous manner.

Most of the vegetable oils are quite highly unsaturated, a large proportion of them being semi-drying oils. Cocoanut and palm kernel oil are exceptions having a comparatively low degree of saturation, they also contain considerable proportions of esters which are not present in some of the other vegetable oils. The mixture of these esters in their hydrogenated state with the esters from hydrogenated products of what may be termed a more normal character affords products which have useful texture, flavor and nutritive properties. While various vegetable oils or even animal oils could be employed under the present invention, as stated, the process is preferably directed to a composition consisting entirely of nut oils for example, cocoanut oil and peanut oil or Brazil nut oil. These may be used in proportions of about 85 or 90% of cocoanut oil to 10 or 15% of the peanut or Brazil nut oil. The oils may be hydrogenated separately but preferably in admixture. In carrying out this operation a catalyzer made from nickel formate may be employed to advantage, the nickel formate is heated with agitation in oil to about 240° C. and the catalyzer which is produced is filtered out and introduced into the mixture of oils aforesaid for example 90 parts by weight of cocoanut oil to 10 parts of peanut oil, one-half to one per cent of nickel catalyzer may be employed. The temperature is raised to about 160 to 180° C. and hydrogen is introduced. After hydrogenation has been carried to a point where saturation is about 80% complete or so the catalyzer may be removed by filtration and a small amount of palladium catalyzer introduced, the temperature being then reduced 20 to 50 degrees and hydrogenation carried further, preferably to complete saturation that is until the iodine number is zero or within a few units thereof, so that the oil will be completely or substantially completely hydrogenated. Ordinarily to introduce the last portion of hydrogen into the oil to produce a substantially completely hydrogenated product especially when using a nickel catalyzer comparatively high temperatures are required which may impair the flavor of the oil and possibly even introduce acroleins or bodies of an objectionable or toxic character and according to the present invention the oil, in the preferred manner of procedure, is hydrogenated in two stages as it were, preferably employing a palladium catalyzer in the finishing operation. In this manner a clean, wholesome oil free from toxic bodies and substantially completely hydrogenated is obtained which serves as a desirable cooking fat contrary to views heretofore entertained regarding such completely hydrogenated material.

The removal of the catalyzer by simple filtration usually does not succeed in eliminating the last traces of the metal and the latter may be removed by treatment with steam in the finishing step of deodorizing the oil. For this purpose the oil is subjected to steam which may be superheated or not at a temperature between 200 and 250° C., or slightly higher, and under a fairly high vacuum preferably 26 to 29 inches mercury gauge. The oil is exposed to steam under these conditions for 15 to 30 minutes which causes the removal of noxious gases and certain impurities causing the oil to be sweetened and at the same time precipitating any dissolved nickel compounds. On filtration a sweet fatty product is obtained. This is run over a chill roll to solidify the molten composition and then may be agitated with air or preferably with non-oxidizing gases such as nitrogen or carbon monoxide. Aeration in this manner produces a whiter product and when using inert gases the product has even better keeping qualities. It may be stated that the complete hydrogenation of the product reduces the oxidizing tendency to a very low degree so that the production of gummy substances and the like which may form in partially hydrogenated oils through oxidation does not obtain in the completely hydrogenated mixture of the preferred form of the present invention.

If the oil mixture is to be bleached it may be done to advantage just subsequent to the deodorizing step. While as stated, cocoanut oil, peanut oil or Brazil nut oil form the preferred oil raw materials employed in carrying out the present invention I do not wish to be restricted to such use but may under various forms of the invention employ other oils such as cottonseed, corn, sesame, linseed, soya bean, cohune oil and walnut oil and also may add animal fats such as beef stearine in natural form or hydrogenated as well as various hydrogenated animal oils including fish and whale oil if the circumstances warrant the use of such fatty oils.

In the foregoing illustration I have mentioned the use of about 10% of hydrogenated peanut oil but it should be understood that I may vary the proportion of the latter to modify the melting point of the cocoanut oil as required within the limits to produce a product of lard-like texture or appearance or consistency and this will depend to some extent upon average temperature conditions. A product intended for tropical countries will require perhaps 50% more peanut oil than that required for normal climates.

Cocoanut oil usually has a saponification value of about 257 and an iodin number of about 8, while palm kernel oil usually has a saponification value of 247 and an iodin number of about 13. Each of these oils has a low refractive index (about 35 and 37.5, respectively, for the common grades).

I, accordingly, designate these oils, as distinguished from ordinary oils, by the expression "oil normally having an iodin number substantially below 25 and a saponification value above 240".

Cotton-seed oil has a saponification value around 192, an iodin value about 107 and a refractive index around 57. Peanut oil has a saponification value of about 189 to 194 and an iodin number about 83 to 100. It is accordingly to be noted that peanut oil and cotton-seed oil have a saponification value substantially below 200 and an iodin value substantially over 80. Also palm kernel oil and cocoanut oil may be considered as belonging to one class, and cotton-seed oil and peanut oil may be considered as belonging to a substantially different class.

This invention is a continuation of matter disclosed in Serial 808,461 and related applications and does not embrace butter substitutes formed from completely hydrogenated oils such compositions being claimed in my copending application Serial No. 273,040 filed January 25, 1919.

From the foregoing it will be seen that one feature of a preferred embodiment of the present process involves admixing an oil such as peanut or Brazil nut oil which is capable of being hydrogenated to a relatively hard product with an oil of the nature of cocoanut oil which is not capable of being hardened to an extremely hard product but in its substantially completely hydrogenated form is a relatively soft fat. The invention also embraces the process of making the product herein described.

What I claim is:—

1. A process which comprises partially hydrogenating a mixture of normally highly unsaturated oil and normally slightly unsaturated oil, first in the presence of a nickel catalyst at a temperature of about 160° to 180° C., and thereafter further hydrogenating the said material in the presence of a highly active catalyst.

2. A process which comprises partially hydrogenating a mixture of a normally highly unsaturated oil and a normally slightly unsaturated oil, first in the presence of a nickel catalyst at a temperature of about 160 to 180° C., then lowering the temperature somewhat and further hydrogenating in the presence of a palladium catalyst, such latter hydrogenation being substantially complete.

CARLETON ELLIS.